US007016395B2

(12) United States Patent
Watanabe et al.

(10) Patent No.: US 7,016,395 B2
(45) Date of Patent: Mar. 21, 2006

(54) METHOD AND APPARATUS FOR PERFORMING WIRELESS COMMUNICATION USING SPREAD SPECTRUM-FREQUENCY HOPPING

(75) Inventors: Jun Watanabe, Ome (JP); Kazuyoshi Kuwahara, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 831 days.

(21) Appl. No.: 10/025,489

(22) Filed: Dec. 26, 2001

(65) Prior Publication Data

US 2002/0080855 A1 Jun. 27, 2002

(30) Foreign Application Priority Data

Dec. 27, 2000 (JP) ............................. 2000-399291

(51) Int. Cl.
*H04B 1/69* (2006.01)
(52) U.S. Cl. ..................................... 375/132
(58) Field of Classification Search ............... 375/132, 375/133, 138; 370/281, 319, 344, 321, 322, 370/326, 329, 330, 336

See application file for complete search history.

(56) References Cited

U.S. PATENT DOCUMENTS

| 5,809,059 | A | | 9/1998 | Souissi et al. ............... 375/202 |
| 5,917,812 | A | * | 6/1999 | Antonio et al. .............. 370/337 |
| 5,918,181 | A | * | 6/1999 | Foster et al. .............. 455/456.1 |
| 6,760,319 | B1 | * | 7/2004 | Gerten et al. ................ 370/335 |

FOREIGN PATENT DOCUMENTS

| EP | 1 039 655 A2 | 9/2000 |
| JP | 5-22243 | 1/1993 |
| JP | 5-130053 | 5/1993 |
| JP | 6-343066 | 12/1994 |
| JP | 7-107010 | 4/1995 |
| JP | 7-307688 | 11/1995 |
| JP | 7-321708 | 12/1995 |
| JP | 10-190551 | 7/1998 |
| JP | 10-261980 | 9/1998 |
| JP | 10-271041 | 10/1998 |
| JP | 11-177531 | 7/1999 |
| JP | 2000-307551 | 11/2000 |
| JP | 2001-177445 | 6/2001 |

OTHER PUBLICATIONS

Examiner H. Doi, "Notification of Reasons for Rejection" from the Japanese Patent Office, mailed Mar. 18, 2003, 2 pages. (English translation also enclosed.).

* cited by examiner

*Primary Examiner*—Emmanuel Bayard
(74) *Attorney, Agent, or Firm*—Finnegan, Henderson, Farabow, Garrett & Dunner, L.L.P.

(57) ABSTRACT

A wireless communication apparatus conducts wireless communication of a spread spectrum communication system that performs frequency hopping using a plurality of frequency channels having different frequencies and defined in a usable frequency band. The apparatus includes a unit which detects a carrier of another wireless communication system that is predetermined, and a unit which excludes a frequency channel of the plurality of frequency channels in which the carrier of the wireless communication system is detected, from frequency channels targeted for the frequency hopping.

10 Claims, 7 Drawing Sheets

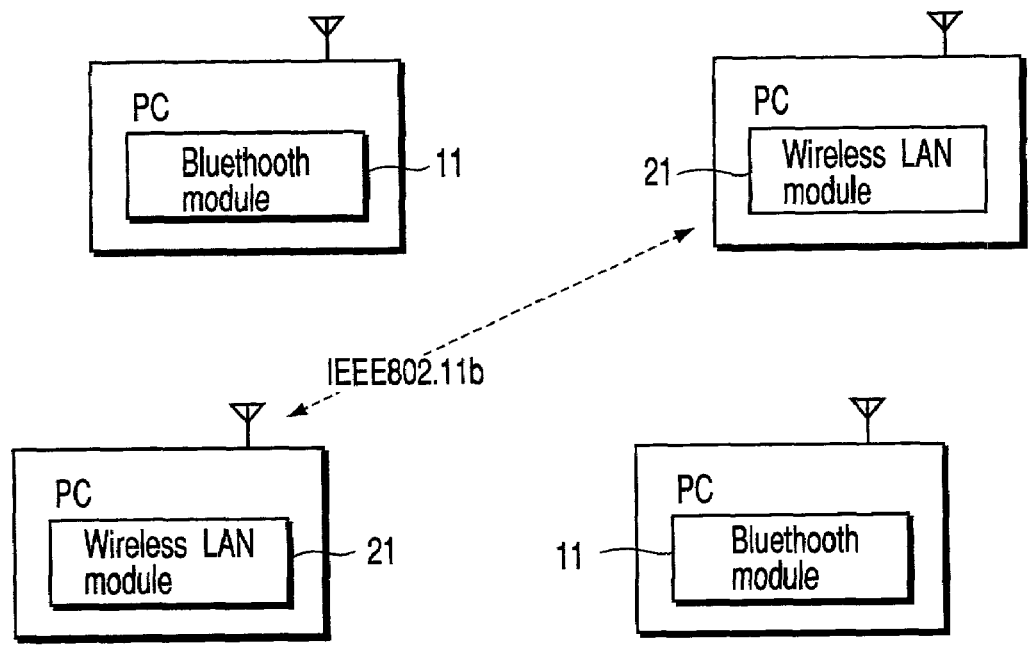
F I G. 2
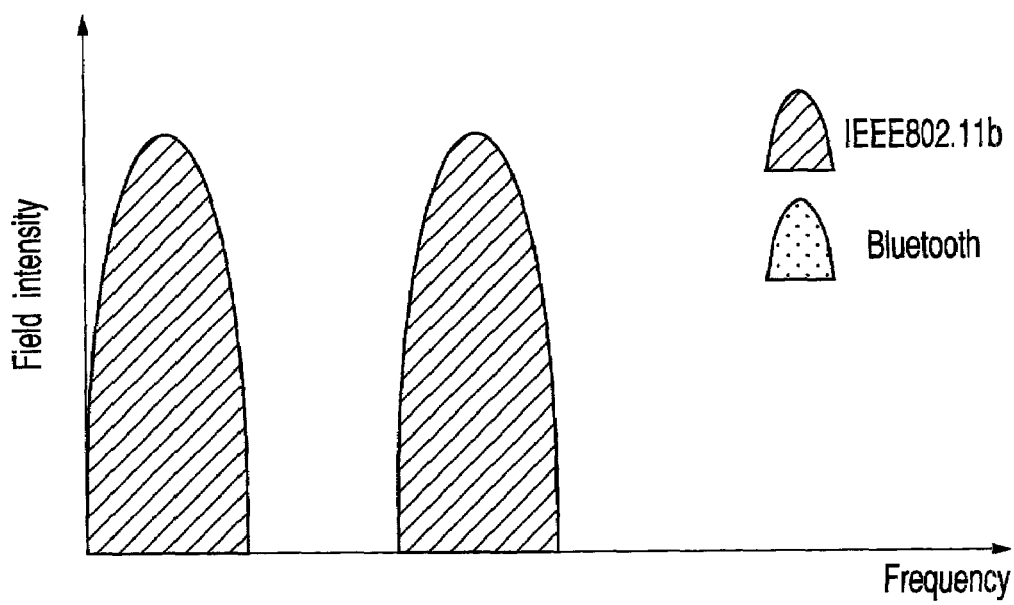
F I G. 3

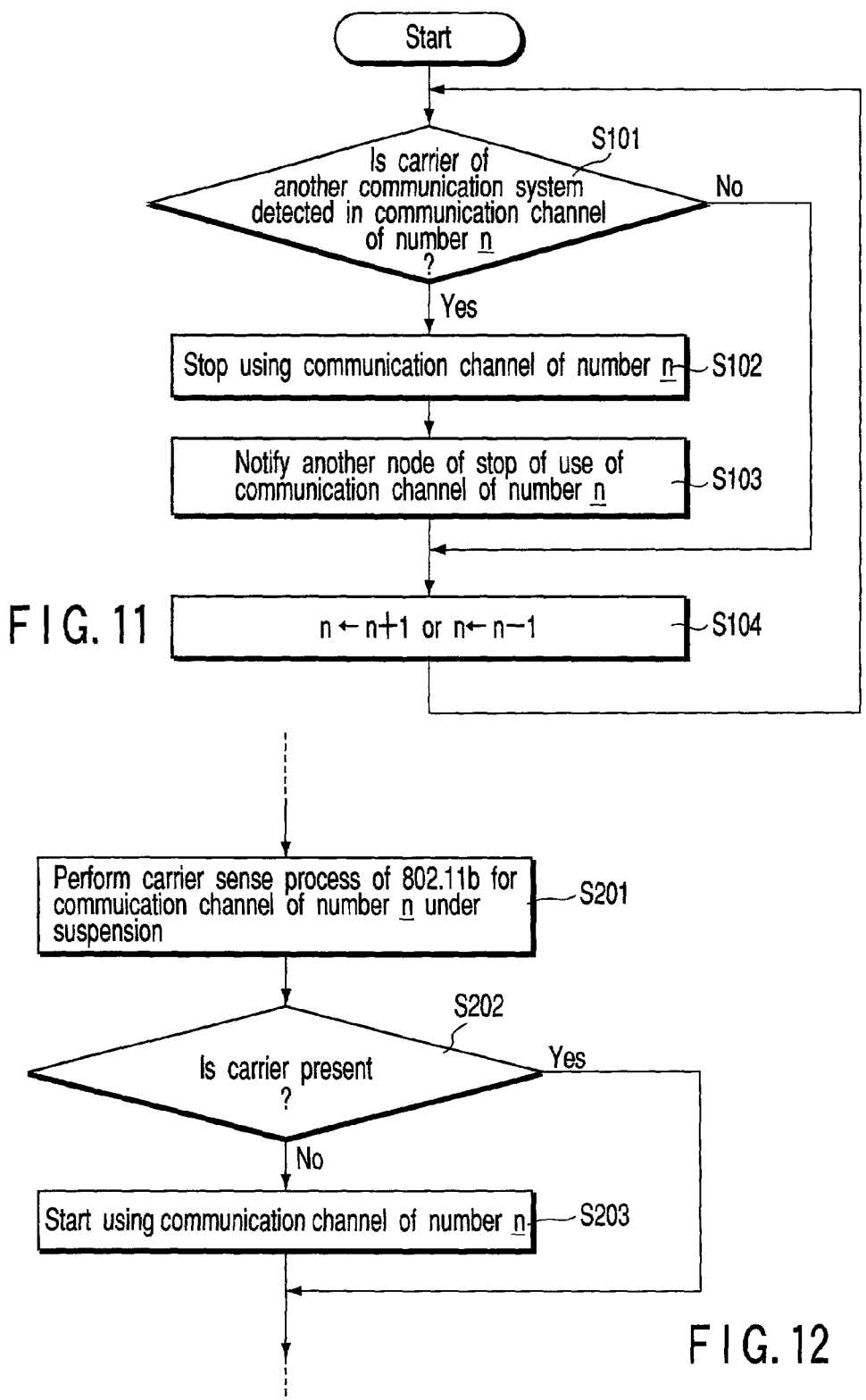

METHOD AND APPARATUS FOR PERFORMING WIRELESS COMMUNICATION USING SPREAD SPECTRUM-FREQUENCY HOPPING

CROSS-REFERENCE TO RELATED APPLICATIONS

This application is based upon and claims the benefit of priority from the prior Japanese Patent Application No. 2000-399291, filed Dec. 27, 2000, the entire contents of which are incorporated herein by reference.

BACKGROUND OF THE INVENTION

1. Field of the Invention

The present invention relates to a method and an apparatus for performing wireless communication using spread spectrum-frequency hopping. More specifically, the invention relates to a method and an apparatus for performing wireless communication, which are applied to a short-range wireless communication system.

2. Description of the Related Art

A new short-range wireless communication system for wirelessly connecting electronic apparatuses by radio signal has recently been developed. IEEE 802.11b and Bluetooth™ are known as typical short-range wireless communication systems.

IEEE 802.11b is a standard of a short-range wireless communication system targeted for a wireless LAN, while Bluetooth™ is a standard of a short-range wireless communication system targeted for wireless communication between various pieces of mobile and digital equipment. In either of the above wireless communication systems, a plurality of frequency channels are defined within a 2.4-GHz frequency band called an ISM (Industrial, Scientific and Medical) band, and these frequency channels are used selectively.

If, however, wireless communication using IEEE 802.11b and wireless communication using Bluetooth™ are carried out in the same area, there is a risk that interference of electromagnetic signals will occur between them. This interference decreases the wireless communication performance of the both IEEE 802.11b and Bluetooth™. Especially, the interference greatly influences the wireless communication performance of IEEE 802.11b. The wireless communication performance of IEEE 802.11b is therefore decreased significantly. Moreover, there is a case where disconnection of a radio link disables the wireless communication of IEEE 802.11b.

BRIEF SUMMARY OF THE INVENTION

An object of the present invention is to provide a wireless communication method and a wireless communication apparatus capable of preventing interference from occurring between different wireless communication systems using the same frequency band.

According to one aspect of the present invention, there is provided a wireless communication method for use in a spread spectrum communication system which performs frequency hopping using a plurality of frequency channels having different carrier frequencies and defined in a specified frequency band, comprising: detecting a carrier of another wireless communication system that performs a wireless communication by using the specified frequency band; and excluding a frequency channel of the plurality of frequency channels in which the carrier of the another wireless communication system is detected, from frequency channels targeted for the frequency hopping.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

FIG. 2 is a block diagram of communications performed in a single wireless communication mode in the system shown in FIG. 1.

FIG. 3 is a graph of use states of frequencies in the communications shown in FIG. 2.

FIG. 11 is a flowchart of a channel select control process performed in the system shown in FIG. 1.

FIG. 12 is a flowchart explaining an operation of reusing a channel under suspension in the system shown in FIG. 1.

DETAILED DESCRIPTION OF THE INVENTION

Figure 1:
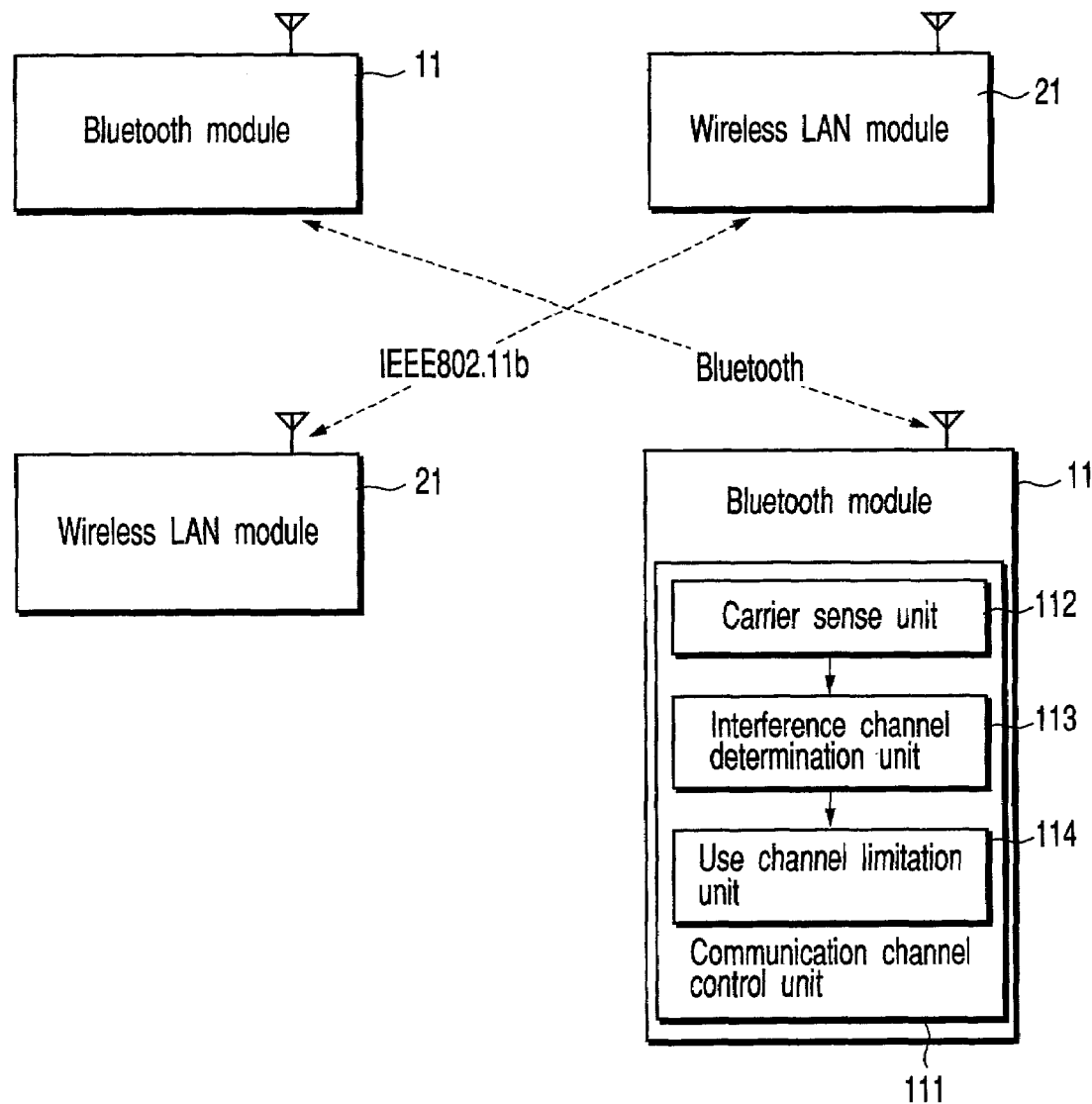
FIG. 1 is a block diagram showing a configuration of a wireless communication system according to an embodiment of the present invention.

An embodiment of the present invention will now be described with reference to the accompanying drawings. FIG. 1 shows a configuration of a wireless communication system to which a wireless communication method according to the embodiment of the present invention is applied. The wireless communication method is used to prevent interference of radio signals from occurring among a plurality of wireless communication systems using the same frequency band. In the present embodiment, IEEE 802.11b and Bluetooth™ are exemplified as the wireless communication systems. In either of the systems, a plurality of frequency channels are defied within a 2.4-GHz frequency band called an ISM (Industrial, Scientific and Medical) band, and these frequency channels are used selectively.

A Bluetooth™ module 11 is a wireless communication device that conducts wireless communication based on the Bluetooth™ standard. The wireless communication system of the Bluetooth™ standard employs spread spectrum-frequency hopping (SS-FH) that transmits signals while varying their carrier frequencies at regular time intervals. 79 frequency channels are assigned to a 2.4-GHz frequency band at intervals of 1 MHz. The frequency channels (referred to as communication channels hereinafter), which serve as carrier frequencies, are switched time-divisionally for each time slot based on a pseudo-noise code indicating a hopping pattern (frequency hopping). That is, the spread spectrum-frequency hopping (SS-FH) is a spread spectrum communication technique in which the frequency of a carrier is changed pseudo-randomly.

The wireless communication of the Bluetooth™ standard is achieved by a master-slave system, and a master manages the hopping patterns to be used. Using the same hopping pattern, a wireless network called Piconet can be organized between one master and seven slaves at the maximum.

A wireless LAN module 21 is a wireless communication device, which conducts wireless communication based on the IEEE 802.11b standard. Spread spectrum-direct sequence (SS-DS) is used in the wireless communication system of the IEEE 802.11b standard. 14 frequency channels (referred to as communication channels hereinafter) are assigned to a frequency band of 2.4 GHz at intervals of about 5 MHz. One or more selected communication channels can be used. A carrier having a carrier frequency which is the same as the central frequency of a selected communication channel, is primary-modulated by an information signal and then secondary-modulated (spread-modulated) by a pseudo-noise code (spread code). The wireless network includes an ad hoc network for performing a peer-to-peer communication between stations in an area called a BSA (basic service area) and an infrastructure network for performing one-to-many communications among stations through an access point. In order to avoid a collision of signals occurring on the wireless network, a collision avoidance function called CSMA/CA (carrier sense multiple access with collision avoidance) is used.

In the present embodiment, the Bluetooth™ module 11 includes a communication channel control unit 111 in order to prevent interference of radio signals from occurring between IEEE 802.11b and Bluetooth™ using the same radio frequency band.

Bluetooth™ Module

The communication channel control unit 111 detects whether a carrier of IEEE 802.11b is present in each of communication channels used by the Bluetooth™ module 11 and stops using a communication channel (interference channel) in which the carrier is detected (releases the interference channel to IEEE 802.11b). The communication channel control unit 111 includes a carrier sense unit 112, an interference channel determination unit 113, and a use channel limitation unit 114, as shown in FIG. 1.

The carrier sense unit 112 executes a carrier sense process to detect a carrier of another wireless communication system such as IEEE 802.11b used in the same area of the Bluetooth™ module 11. The carrier sense process to detect a carrier of another wireless communication system can easily be performed by checking a field intensity level in the area. Since, however, the carrier of IEEE 802.11b using spread spectrum-direct sequence (SS-DS) is low in field intensity level and may be difficult to distinguish from noise. It is thus desirable to perform a carrier sense process by de-spreading a received signal using a spread code that is supposed to be used for spread modulation in the IEEE 802.11b and determining whether a peak of the field intensity level which is higher than a specific value can be detected by the de-spread.

The interference channel determination unit 113 determines whether each of 79 communication channels used in Bluetooth™ interferes with IEEE 802.11b based on carrier sensing results of the carrier sense unit 112. A communication channel including a carrier of IEEE 802.11b is determined as an interference channel. Since in Bluetooth™ all of the 79 communication channels are basically switched and used for each time slot, the unit 113 determines whether a carrier of IEEE 802.11b is present in each of the 79 communication channels.

The use channel limitation unit 114 performs control to stop using a communication channel of the 79 communication channels of Bluetooth™, which is determined as an interference channel by the interference channel determination unit 113, namely, a communication channel in which the presence of a carrier of IEEE 802.11b is detected. The communication channel that is determined as an interference channel is therefore omitted from the communication channels targeted for frequency hopping. The frequency hopping is performed among the communication channels other than the interference channel.

In Bluetooth™, all the communication control including management of a hopping pattern is performed principally by a master. Therefore, the above-described carrier sense and interference channel determination processes are performed only by the master, and the master has only to notify the slaves of the stop of use of a communication channel determined as an interference channel.

The Bluetooth™ module 11 is usually configured as a one-chip LSI or a two-chip LSI including an RF unit, a baseband unit, and a storage unit that stores firmware (containing protocol stack) for controlling the RF and baseband units. Since the control for frequency hopping is performed by a protocol stack of the baseband unit, the function of the above communication channel control unit 111 can be incorporated into the protocol stack of the baseband unit.

Channel Select Control

The principle of a channel select control operation for preventing an interference channel from occurring will now be described.

1. Performing communication in a single wireless communication mode (FIGS. 2 and 3):

FIG. 2 shows a state in which only wireless communication of IEEE 802.11b is performed in a certain area. Referring to FIG. 2, a plurality of personal computers serving as electronic equipment mounted with the Bluetooth™ modules 11 and a plurality of personal computers serving as electronic equipment mounted with the wireless LAN modules 21 are present in the same area such as one room in an office. The foregoing ad hoc network or infrastructure network is constructed between the wireless LAN modules 21. Radio communication is conducted between nodes in the networks in accordance with the protocol of IEEE 802.11b. No radio communication is done between nodes mounted with the Bluetooth™ modules 11.

In this case, the ISM band is used only in the wireless communication of IEEE 802.11b as shown in FIG. 3. FIG.

3 shows a case where two communication channels are used simultaneously by IEEE 802.11b. When communication is carried out in such a single wireless communication mode, no influence is exerted upon a bit error rate (BER) or an effective communication speed.

Figure 4:
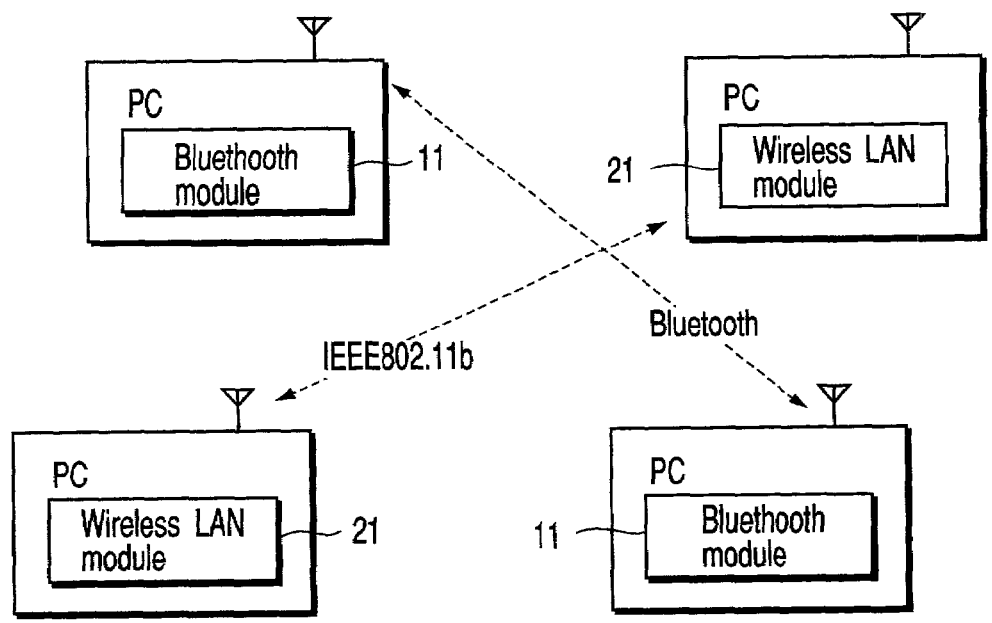
FIG. 4 is a block diagram of communications performed in a plurality of wireless communication modes in the system shown in FIG. 1.
Figure 5:
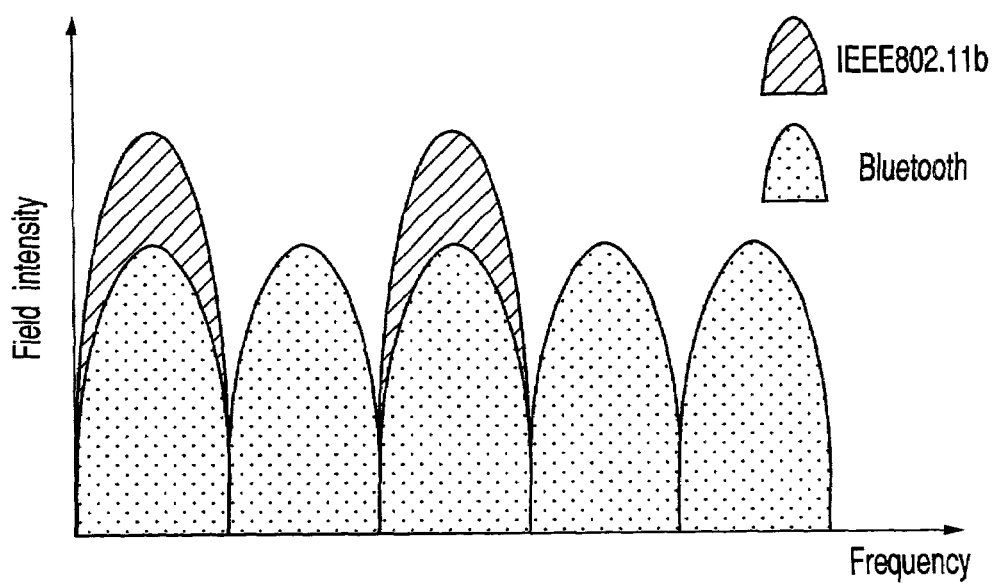
FIG. 5 is a graph of use states of frequencies in the communications shown in FIG. 4.

2. Simultaneously using a plurality of wireless communication modes of the same frequency band (FIGS. 4 and 5):

When wireless communication starts between Bluetooth™ modules 11 as illustrated in FIG. 4, radio signals of two different wireless communication systems using the same frequency band are mixed as illustrated in FIG. 5. In a communication channel on which interference occurs, a BER increases in both IEEE 802.11b and Bluetooth™, with the result that the number of times of retransmission control increases, the effective communication speed lowers, and at worst a radio link is disconnected.

Figure 6:
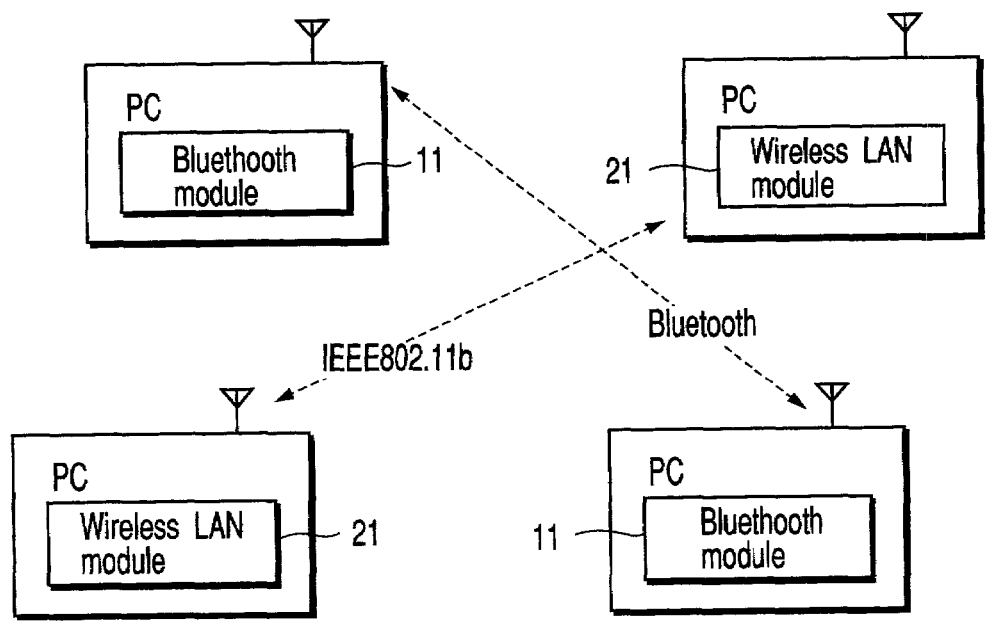
FIG. 6 is a block diagram of communications performed by selectively using communication channels in a plurality of wireless communication modes in the system shown in FIG. 1.

3. Selectively using communication channels (FIGS. 6 and 7):

According to the present embodiment, before wireless communication starts according to the protocol of the Bluetooth™ standard or during the wireless communication, the Bluetooth™ module 11 periodically determines whether each of communication channels used for the wireless communication interferes with another communication system (IEEE 802.11b). If the module 11 determines a communication channel as an interference channel, it stops using the interference channel. Since the interfering channel is excluded by limiting the communication channels used by the Bluetooth™ module 11 (see FIG. 7), it is possible to resolve the problem that one of IEEE 802.11b and Bluetooth™ cannot be used for communication or the effective communication speed of one of them is extremely decreased. Especially in Bluetooth™, some of communication channels targeted for hopping are simply reduced even though the use of the interference channel is stopped, so that an influence upon the effective communication speed can be lessened. Furthermore, the reduction of communication channels targeted for hopping allows the BER of the communication channels of IEEE 802.11b to be decreased in a band where the communication channels of Bluetooth™ are not used.

Figure 7:
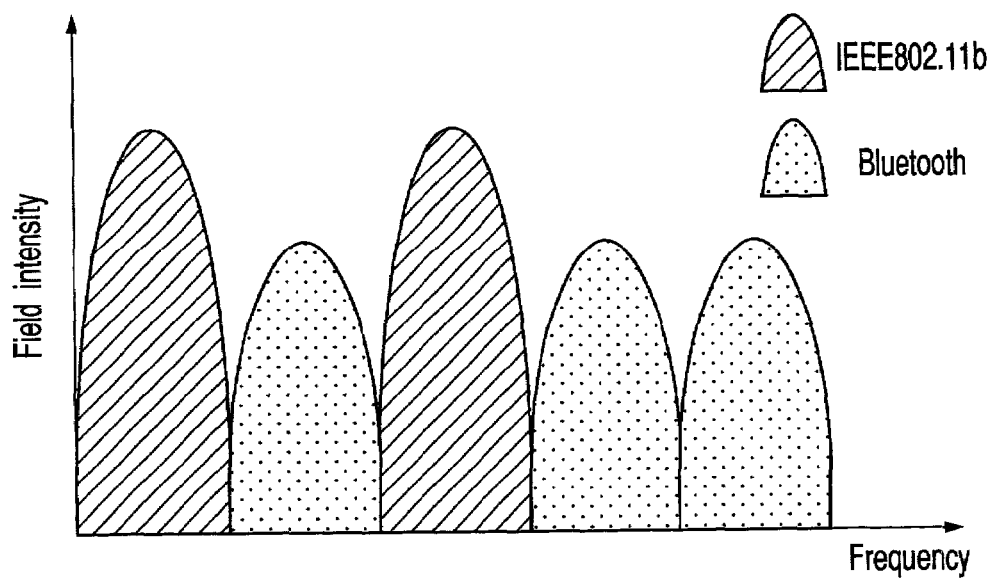
FIG. 7 is a graph of use states of frequencies in the communications shown in FIG. 6.
Figure 8:
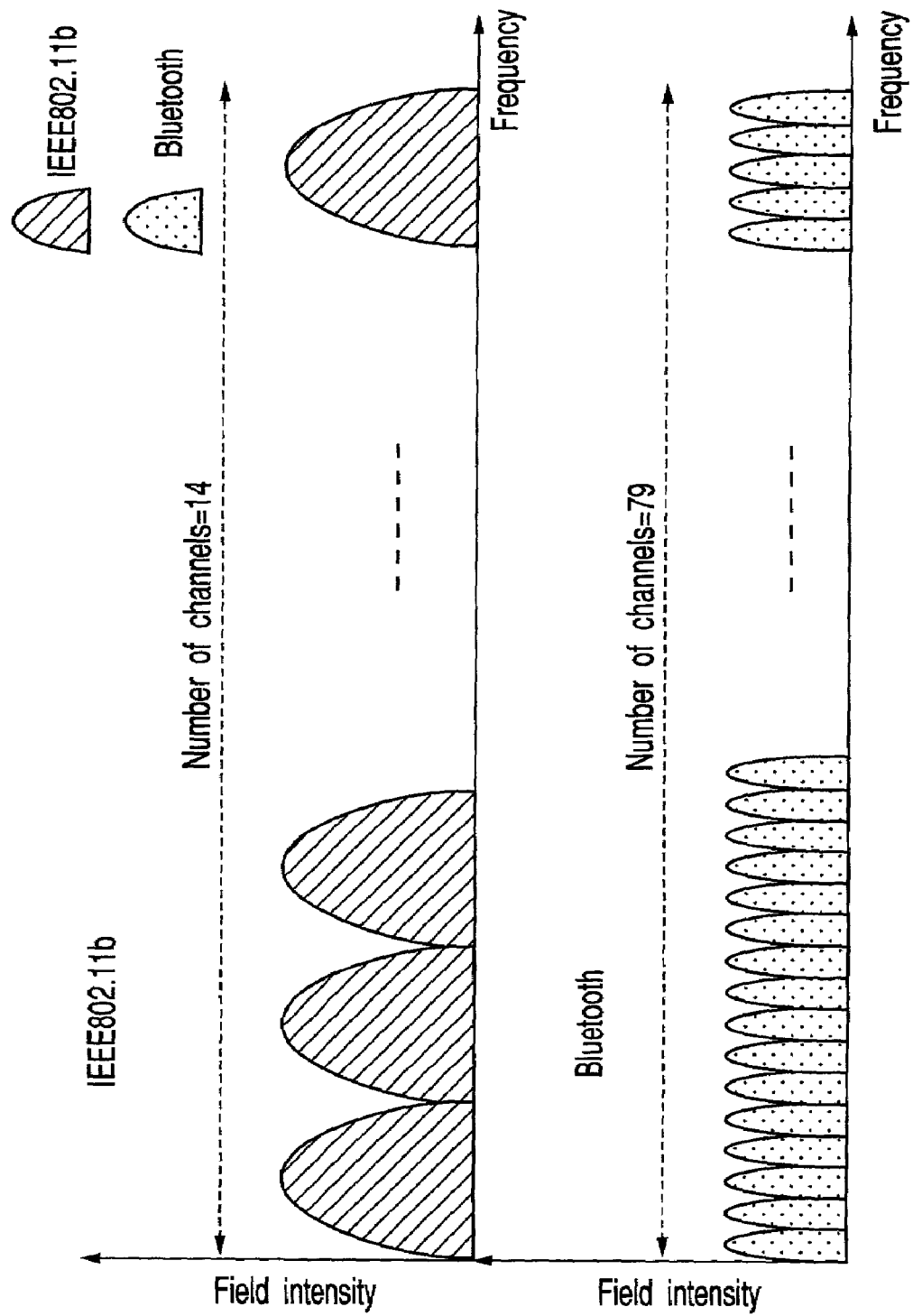
FIG. 8 is a graph explaining a communication channel of each of a plurality of wireless communication modes used in the system shown in FIG. 1.

In FIGS. 3, 5 and 7, the Bluetooth™ and IEEE 802.11b are shown to have the same communication channel width for simple description. Actually, as shown in FIG. 8, 79 communication channels are defined at intervals of 1 MHz within the ISM band in the Bluetooth™, while 14 communication channels are defined within the ISM band in the IEEE 802.11b. The bandwidth of one communication channel of IEEE 802.11b is 22 MHz (±11 MHz from the central frequency). In other words, continuous, at most, 22 communication channels of Bluetooth™ interfere with one communication channel of IEEE 802.11b.

Figure 9:
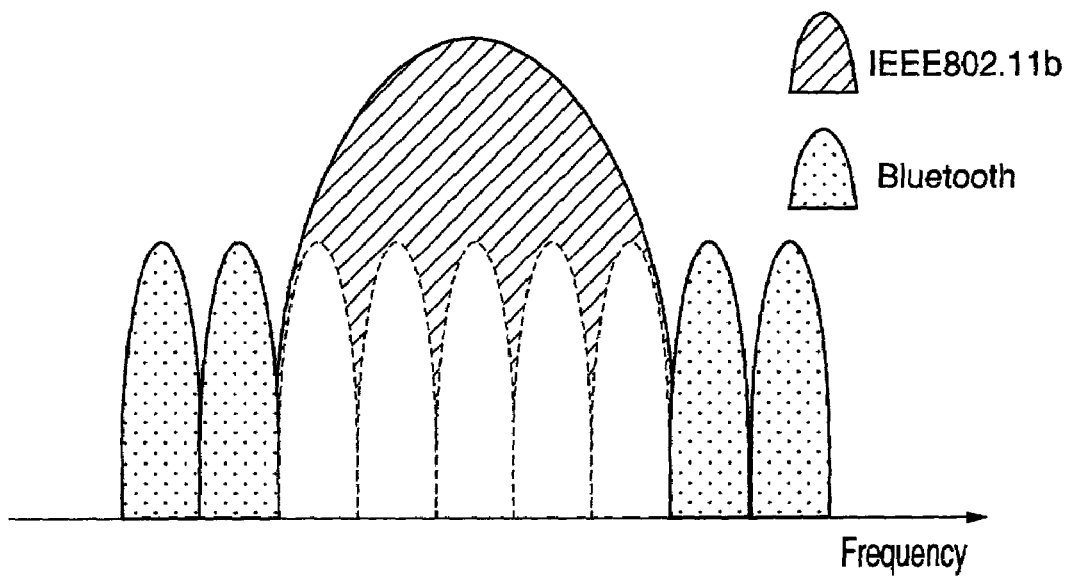
FIG. 9 is a diagram showing avoidance of channel interference in the system shown in FIG. 1.
Figure 10:
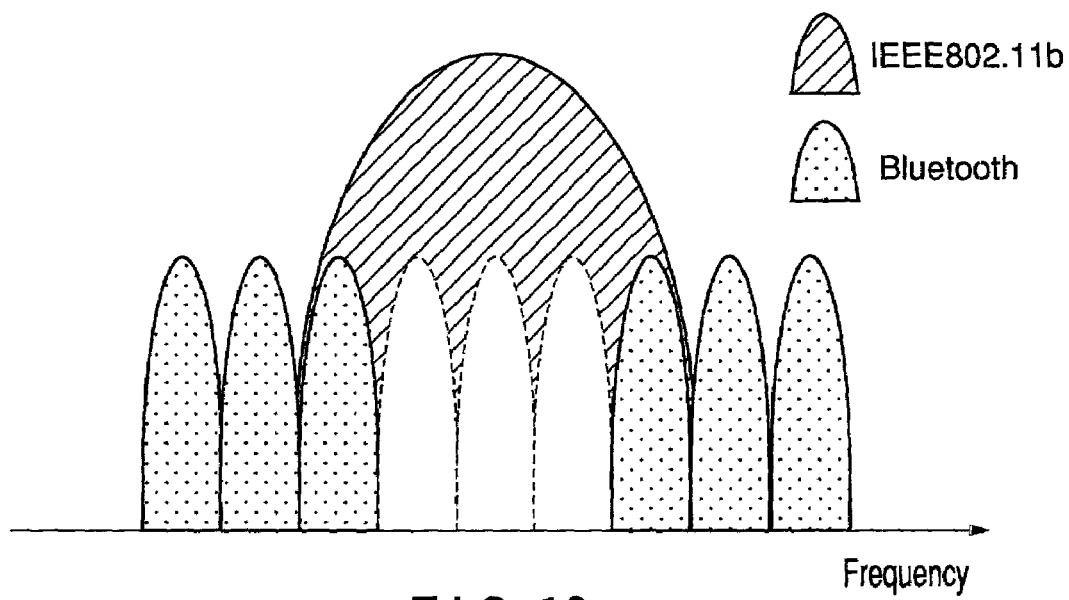
FIG. 10 is a diagram showing avoidance of channel interference in the system shown in FIG. 1.

When the use of interfering channel is stopped on the Bluetooth™ side, the use of 22 communication channels of Bluetooth™ that overlap those of IEEE 802.11b is stopped as indicated by broken lines in FIG. 9. It is needless to say that not all of 22 communication channels of Bluetooth™ that overlap a communication channel of IEEE 802.11b cause substantial interference. Therefore, as illustrated in FIG. 10, the use of only the communication channels in which a detected carrier component exceeds a given value, can be stopped.

The carrier sense unit 112 has only to sense a carrier of IEEE 802.11b, targeting for each of 14 communication channels usable in IEEE 802.11b.

In this case, the unit 112 can determine whether a carrier of IEEE 802.11b is present or absent only for 14 communication channels of 79 communication channels of Bluetooth™, which have the same frequency as the central frequency of each of 14 communication channels of IEEE 802.11b. When the unit 112 senses the presence of carrier of IEEE 802.11b, the stop of use of the following communication channels is automatically determined:

1) Communication channels in which the carrier of IEEE 802.11b is sensed
2) Some communication channels belonging to the frequency band of ±11 MHz from the frequency of each of the communication channels in which the carrier of IEEE 802.11b is sensed Process of Channel Select Control One example of a specific process of channel select control performed by the communication channel control unit 111 will now be described with reference to the flowchart of FIG. 11.

As described above, the channel select control is performed prior to the start of communication (before a radio link is constructed between a master and a slave) or during the communication (after a radio link is constructed).

First, the communication channel control unit 111 performs a carrier sense process to determine whether a carrier of IEEE 802.11b is present or not in a band of a communication channel n (n=channel number) of Bluetooth™ (step S101). For example, the unit 111 de-spreads (reversely diffuses) a signal received through the band of communication channel n by multiplying the signal by a spread code to be used in the IEEE 802.11b and determines whether a carrier of IEEE 802.11b is present or not in a band of communication channel n according to whether a power peak that is higher than a specific value is detected by the de-spread.

When the unit 111 determines that a carrier of IEEE 802.11b is present (YES in step S101), the stop of use of communication channel n is determined (step S102). If communication is being conducted between Bluetooth™ modules 11, a master that has decided to stop using the communication channel n notifies the respective slaves of destinations of communication that the use of communication channel n is to be stopped (step S103). Thus, the communication channel n is excluded from a frequency hopping pattern used in communication between the master and each slave, and frequency hopping is performed between the remaining communication channels (communication channel n is skipped).

Then, the channel number n is incremented by 1 (+1) or decremented by 1 (−1) (step S104) and the above process is performed again from step S101. Thus, the unit 111 checks the presence or absence of carriers of IEEE 802.11b for all of 79 communication channels and determines whether each of the communication channels is the influence channel.

When the channel select control is performed before the start of communication, the master has only to generate a code indicating frequency hopping pattern excluding a communication channel the stop of use of which is determined and notify a slave of the code.

In order to determine whether a carrier of IEEE 802.11b is present only for 14 communication channels of Bluetooth™ having the same frequency as the central frequency of each of 14 communication channels of IEEE 802.11b as described above, the use of some of 79 communication channels of Bluetooth™, which belong to a given frequency including the frequencies of communication channel n of Bluetooth™ from which a carrier of IEEE 802.11b is detected, is stopped, and these communication channels are excluded from the hopping pattern.

Referring to the flowchart of FIG. 12, a process of reusing a communication channel performed by the communication channel control unit 111 will now be described.

The unit 111 performs a carrier sense process for a communication channel n (n=channel number) under suspension to determine whether a carrier of IEEE 802.11b is present or not in a band of the communication channel n (step S201). When no carries are present in the band (NO in step S202), the communication channel n is not used by IEEE 802.11b any more and thus reused (step S203). This reuse is performed by adding the communication channel n to frequency channels targeted for hopping. Thereby, communication channel n is not skipped.

On the other hand, when a carrier of IEEE 802.11b is present in the communication channel n (YES in step S202), a process for making the communication channel n to frequency channels targeted for hopping is not performed but the current channel use sate is maintained as it is.

According to the above-described embodiment, the presence or absence of carrier of IEEE 802.11b is determined for each of 79 communication channels of Bluetooth™. When a frequency channel includes a carrier of IEEE 802.11b, its use is stopped. If such a process is periodically performed before the start of communication of Bluetooth™ or during the communication of Bluetooth™, interference can be prevented from occurring between Bluetooth™ and IEEE 802.11b.

The channel select control of the present embodiment can be applied to not only the Bluetooth™ but also any other wireless communication methods if spread spectrum communication is performed using frequency hopping.

The functions of the communication channel control unit 111 can be fulfilled by software that is executed on electronic equipment such as a personal computer mounted with the Bluetooth™ module 11.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. A wireless communication method for use in a spread spectrum communication system which performs frequency hopping using a plurality of frequency channels having different carrier frequencies and defined in a specified frequency band, the method comprising:

detecting a carrier of another wireless communication system that performs a wireless communication by using the specified frequency band;

excluding a frequency channel of the plurality of frequency channels in which the carrier of said another wireless communication system is detected, from frequency channels targeted for the frequency hopping;

determining again whether the carrier of said another wireless communication system is present in the frequency channel excluded from the frequency channels targeted for the frequency hopping; and adding the excluded frequency channel to the frequency channels targeted for the frequency hopping when the carrier of said another wireless communication system is not detected.

2. The wireless communication method according to claim 1, wherein wireless communication of the spread spectrum communication system is conducted by a master-slave system, the carrier of said another wireless communication system is detected by a master in the spread spectrum communication system, and said excluding includes notifying a slave of a stop of use of the frequency channel in which the carrier of said another wireless communication system is detected by the master.

3. The wireless communication method according to claim 1, wherein said another wireless communication system is a spread spectrum-direct sequence communication system, and said detecting includes de-spreading a received radio signal by using a spread code used in said another wireless communication system to detect the carrier of said another wireless communication system.

4. The wireless communication method according to claim 1, wherein wireless communication of the spread spectrum communication system is conducted by a master-slave system, and the carrier of said another wireless communication system is detected by a master in the spread spectrum communication system, before a radio link is constructed between the master and slave.

5. The wireless communication method according to claim 4, wherein said master generates a code indicating a hopping pattern excluding a frequency channel in which the carrier of said another wireless communication system is detected, and notifies the slave of the code.

6. The wireless communication method according to claim 1, wherein said detecting includes executing a carrier sense process to determine whether the carrier of the second wireless communication system is present in each of the plurality of frequency channels.

7. The wireless communication method according to claim 1, wherein said another wireless communication system performs a wireless communication by using another frequency channel having a bandwidth that is larger than the bandwidth of each of the frequency channels used for the frequency hopping, and the excluding includes excluding frequency channels belonging to said another frequency channel, from frequency channels targeted for the frequency hopping, when the carrier of said another wireless communication system is detected.

8. A wireless communication apparatus of a spread spectrum communication system which performs frequency hopping using a plurality of frequency channels having different frequencies and defined in a specified frequency band, the apparatus comprising:

a detecting unit configured to detect a carrier of another wireless communication system that performs a wireless communication by using the specified frequency band;

an excluding unit configured to exclude a frequency channel of the plurality of frequency channels in which the carrier of said another wireless communication system is detected, from frequency channels targeted for the frequency hopping;

a unit which determines again whether the carrier of said another wireless communication system is present in the frequency channel excluded from the frequency channels targeted for the frequency hopping; and a unit which adds the excluded frequency channel to the frequency channels targeted for the frequency hopping when the carrier of said another wireless communication system is not detected.

9. The wireless communication apparatus according to claim 8, wherein said another wireless communication system is a spread spectrum-direct sequence communication system, and said detecting unit includes a unit which de-spreads a received radio signal by using a spread code used in said another wireless communication system to detect the carrier of said another wireless communication system.

10. The wireless communication apparatus according to claim 8, wherein said another wireless communication system performs a wireless communication by using another frequency channel having a bandwidth that is larger than the bandwidth of each of the frequency channels used for the frequency hopping, and the excluding unit excludes frequency channels belonging to said another frequency channel, from frequency channels targeted for the frequency hopping, when the carrier of said another wireless communication system is detected.

* * * * *